US011616787B1

(12) United States Patent
Chhabra et al.

(10) Patent No.: US 11,616,787 B1
(45) Date of Patent: Mar. 28, 2023

(54) MECHANISM TO MANAGE GROUP OF RESOURCES USING VIRTUAL RESOURCE CONTAINERS

(71) Applicant: Amazon Technologies, Inc., Seattle, WA (US)

(72) Inventors: Jasmeet Chhabra, Sammamish, WA (US); Harshad Vasant Kulkarni, Bellevue, WA (US); Khaled Salah Sedky, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 398 days.

(21) Appl. No.: 16/457,783

(22) Filed: Jun. 28, 2019

(51) Int. Cl.
*H04L 9/40* (2022.01)

(52) U.S. Cl.
CPC .......... *H04L 63/104* (2013.01); *H04L 63/102* (2013.01); *H04L 63/107* (2013.01); *H04L 63/20* (2013.01)

(58) Field of Classification Search
CPC ... H04L 63/104; H04L 63/102; H04L 63/107; H04L 63/20
See application file for complete search history.

(56) References Cited

U.S. PATENT DOCUMENTS

| 8,332,470 | B2* | 12/2012 | Arun | G06Q 10/10 709/204 |
| 10,104,185 | B1* | 10/2018 | Sharifi Mehr | H04L 41/0896 |
| 10,516,667 | B1* | 12/2019 | Roth | G06F 21/31 |
| 2007/0124374 | A1* | 5/2007 | Arun | G06Q 10/10 709/204 |
| 2011/0113467 | A1* | 5/2011 | Agarwal | G06F 21/53 726/1 |
| 2013/0208893 | A1* | 8/2013 | Shablygin | H04L 9/3213 380/277 |
| 2013/0246588 | A1* | 9/2013 | Borowicz | H04L 41/08 709/220 |
| 2013/0298183 | A1* | 11/2013 | McGrath | G06F 21/53 726/1 |
| 2014/0006999 | A1* | 1/2014 | Bukurak | G06F 3/0484 715/778 |
| 2014/0181896 | A1* | 6/2014 | Yablokov | G06F 21/53 726/1 |
| 2014/0189777 | A1* | 7/2014 | Viswanathan | H04L 63/105 726/1 |
| 2014/0207861 | A1* | 7/2014 | Brandwine | H04L 51/32 709/204 |

(Continued)

*Primary Examiner* — Jason Chiang
(74) *Attorney, Agent, or Firm* — Davis Wright Tremaine LLP

(57) ABSTRACT

A set of operations is performed to cause a resource accessible to a first set of entities to also be accessible to a member of a second set of entities, where the set of operations, as a result of being executed, causes a processor to create a project to associate with a set of resources, associate a policy that controls access to the set of resources with the projects, associate the resource with the set of resources of the project, and associate the member of the second set of entities with the project. A request is obtained from the member of the second set of entities to access the resource. The member of the second set of entities is determine to be authorized to access the resource based on the policy. The member of the second set of entities is allowed to obtain access to the resource.

21 Claims, 8 Drawing Sheets

(56) References Cited

U.S. PATENT DOCUMENTS

| | | | | |
|---|---|---|---|---|
| 2015/0058923 A1* | 2/2015 | Rajagopal | ............... | H04L 63/20 |
| | | | | 726/1 |
| 2015/0142949 A1* | 5/2015 | Nair | ........................ | H04L 67/10 |
| | | | | 709/224 |
| 2016/0342786 A1* | 11/2016 | Gerebe | .................... | G06F 21/52 |
| 2017/0177892 A1* | 6/2017 | Tingstrom | .............. | G06F 16/22 |
| 2017/0257357 A1* | 9/2017 | Wang | ........................ | G06F 9/455 |
| 2017/0257424 A1* | 9/2017 | Neogi | ...................... | H04L 43/16 |
| 2017/0257432 A1* | 9/2017 | Fu | ........................ | H04L 67/2823 |
| 2018/0108056 A1* | 4/2018 | Chikuvadze | ........ | G06Q 30/0283 |
| 2018/0136960 A1* | 5/2018 | Zhang | ................... | G06F 9/5072 |
| 2018/0144123 A1* | 5/2018 | Levin | ..................... | G06F 21/52 |
| 2018/0336351 A1* | 11/2018 | Jeffries | ................. | H04L 63/101 |
| 2020/0218798 A1* | 7/2020 | Kosaka | .................... | G06F 9/455 |

\* cited by examiner

MECHANISM TO MANAGE GROUP OF RESOURCES USING VIRTUAL RESOURCE CONTAINERS

BACKGROUND

In various contexts, managing computing resources is of utmost importance to many customers of computing resource service providers. Customers of computing resource service providers often desire to create groupings of large sets of resources, which sometimes comprise resources of various types, which can each have varying individual access policies. Managing the policies of such large set of resources and handling various failure modes of the resources can require complicated, manual workflows. Additionally, often some customers of computing resource service providers desire to share resources with each other in order to collaborate on a project. Providing the customers with the ability to define policies for large sets of resources and enables such policies to span across more than one customer account presents a challenge, especially when large amounts of resources and/or customers are involved.

BRIEF DESCRIPTION OF THE DRAWINGS

Various techniques will be described with reference to the drawings, in which.

DETAILED DESCRIPTION

Figure 1:
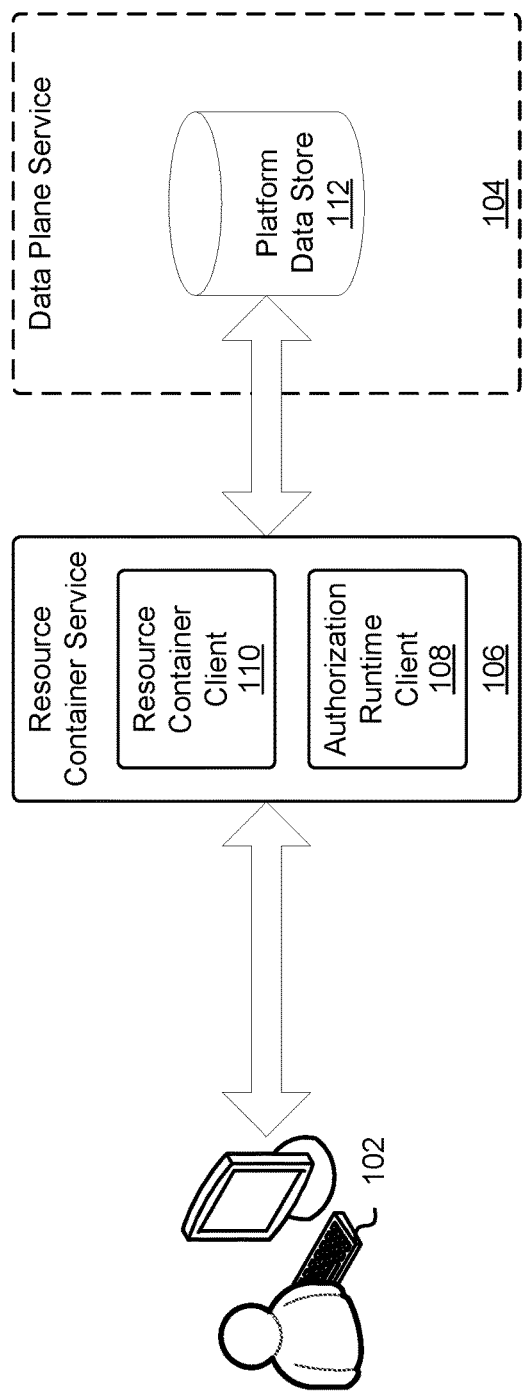
FIG. 1 illustrates an example of a resource container service, in accordance with an embodiment.

Techniques and systems described herein relate to providing customers of a computing resource service provider with a resource container service in which resources can be shared and accessed via a resource container amongst various customers. Customers of the computing resource service provider may create resource containers, and associate various resources with the resource containers. The resource containers may be governed by various policies that dictate the capabilities of various customers with regards to the resource containers. Resource containers may provide various technological advantages, such as the ability to manage access to large sets of resources across various clients/customers.

To illustrate, as an example, a first request for a resource container is received by a computing resource service provider from a requestor via an application programming interface ("API"). In this example, the request specifies a resource container to be created. Continuing with the example, the resource container is created by the computing resource service provider. In some examples, the resource container is created as a data structure and stored in a data storage service. The requestor may perform various actions in connection with the resource container, such as adding various resources to the resource container, adding various policies to the resource container, and the like.

Continuing with the above example, policies for the resource container may include various information dictating the capabilities of various users regarding the resource container. Policies may define the access policies of the resource container. Additionally, policies may define access for individual resources, groups of resources, and/or variations thereof, of the resource container. For example, a policy may define that a specified set of users are allowed read/write access to the resource container, another specified set of users are allowed read access to the resource container, and another specified set of users are not allowed any access to the resource container. These policies may be received by the computing resource service provider via the application programming interface.

Continuing with the above example, resources for the resource container may include various computing resources provided by resource providers. Such resources may include data objects, databases, computing resources, computing instances, and/or variations thereof. In various embodiments, resource containers can also include other resource containers as resources themselves; for example, a resource container can be a superset of one or more other resource containers. These resources may be added to/associated with the resource container such that any user with access to the resource container may access the associated resources. These resources may also have individual access policies within the resource container. Resources may be added to the resource container via the application programming interface; the resource container policies may dictate the entities authorized to add such resources to the resource container.

In an embodiment, a resource container is created to associate with one or more computing resources provided to customers by a computing resource service provider. In the embodiment, an individual from a first customer account at the computing resource service provider is associated with the resource container. Further, in the embodiment, an access policy is associated with the resource container, where the access policy controls access to the one or more computing resources associated with the resource container.

Still in the embodiment, a set of operations is performed to cause a computing resource accessible to individuals of a second customer account at the computing resource service provider to also be accessible to individuals of the first customer account, where the set of operations includes associating the computing resource with the resource container. Also in the embodiment, a request to determine whether the individual associated with the first customer account is authorized to access the computing resource is obtained. Finally, in this embodiment, the individual is caused to obtain access to the computing resource as a result of determining, based on the access policy, that the individual is authorized to access the one or more computing resources.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an aspect of a system 100 in which various embodiments may be practiced. As illustrated in FIG. 1, the system 100 may include a client 102 that communicates with a resource container service 106 that in turn communicates with a data plane service 104. The resource container service 106 may comprise a resource container client 110 and an authorization runtime client 108. The data plane service 104 may comprise a platform data store 112 usable to store and retrieve information related to resource containers as described in the present disclosure.

In an embodiment, the client 102 is any entity operable to access systems and/or services (e.g., the data plane service 104). In some embodiments, the client 102 is a device operated by a customer of a computing resource service provider that hosts one or more of the systems depicted in FIG. 1. The customer may be an individual, group of individuals, business entity or other organization that has a business relationship with the computing resource service provider of the various systems and/or services. In the present disclosure, it is contemplated that use of the term "client" can include a computing device (also referred to as a "client device") used to perform operations under the control of or on behalf of the client (e.g., to access a service and/or system). Examples of such a computing device include one or more instances of a physical computing instance (e.g., a physical server computer, a mobile communication device, a laptop computer, a tablet computer, a personal computer, a mainframe, etc.) or one or more instances of a virtual computing instance, such as a client-accessible virtual machine hosted on one or more computer servers, or other computing system capable of communicating with various systems and/or services. In some examples, a "service" refers to an executing computer application that provides functionality to another computer application.

In some embodiments, the computing resource service provider is an entity that provides to its customers one or more computing resource services individually or as a combination of services of a distributed computer system. Examples of types of computing resources provided by the computing resource service providers include Infrastructure-as-a-service (IaaS), platform-as-a-service (PaaS), and/or software-as-a-service (SaaS). The one or more computing resource services of the computing resource service provider may be accessible to users via a network and may include services such as virtual computer system services, block-level data storage services, cryptography services, on-demand data storage services, notification services, authentication services, policy management services, task services and/or other such services. Not all embodiments described include all of the services described, and additional services may be provided in addition to, or as an alternative to, services explicitly described.

Customers of the computing resource service provider may communicate with one or more of the services via an interface, which may be a web services interface or any other type of customer interface. Each service provided by a computing resource service provider may have its own interface, and subsets of the services may have corresponding individual interfaces in addition to, or as an alternative to, a common interface. A customer may communicate with the computing resource service provider through a network, whereby the network may be a communication network, such as the Internet, an intranet, an internet service provider (ISP) network and/or some other such network as described in the present disclosure. In an embodiment, the computing resource service provider provides services such as the data plane service 104, resource container service 106, and platform data store 112.

The client 102 may communicate to the various systems and/or services through one or more communication networks, such as the Internet. Further, the various communications to/from the client 102 may be orchestrated by a browser or other application executing on a device the client 102 may comprise. In an embodiment, the client 102 communicates to the resource container service 106 through the one or more APIs ("application programming interface"). In some examples, an API may be a set of subroutine definitions, communication protocols, and/or software tools that provide a method of communication to/from the client 102 and the resource container service 106.

The data plane service 104 may be a collection of computing resources configured to synchronously or asynchronously process requests to store and/or access data. The data plane service 104 may allow data to be provided in responses to requests for the data and may operate using computing resources (e.g., databases) that enable the data plane service 104 to locate and retrieve data quickly. For example, the data plane service 104 may maintain stored data in a manner such that, when a request for a data object is retrieved, the data object can be provided (or streaming of the data object can be initiated) in a response to the request. As noted, data stored in the data plane service 104 may be organized into data objects. The data objects may have arbitrary sizes except, perhaps, for certain constraints on size.

The platform data store 112 may be a data store that the data plane service 104 comprises. In some embodiments, the platform data store 112 may be a repository for data object, such as database records, flat files, or other data objects. Examples of such repositories include file systems, relational databases, non-relational databases, object-oriented databases, comma-delimited files, and other such storage implementations. In some embodiments, the platform data store 112 may comprise information regarding various resource containers, such as metadata, tags, policy information, and/or variations thereof. In various embodiments, the platform data store 112 may comprise one or more instances of a physical computing instance, such as a physical server computer, or one or more instances of a virtual computing instance, such as a virtual machine, which may be hosted on one or more computer servers.

The resource container service 106 may be a collection of computing resources, physical and/or virtual, configured to receive and process requests for resource containers. In some examples, a resource container may be a data structure that may logically associate a collection of various computing resources, physical and/or virtual, with each other in a common project in order that they may be shared amongst various entities (e.g., accounts); the resource container (and thereby the resources it "contains") may be constrained with various policies that may denote restrictions for access to the resources. In various embodiments, the resource container service 106 may comprise one or more instances of a physical computing instance, such as a physical server computer, or one or more instances of a virtual computing instance, such as a virtual machine, which may be hosted on one or more computer servers. The resource container service 106 may implement a request API, which, in an embodiment, is an API configured to receive requests to be performed by the resource container service 106. In some examples, the request API may be configured with the following high-level requests available:

CreateResourceContainer(ResourceContainerID)
    PutPolicy(ResourceContainerURN, Policy)
    AttachResource(ResourceContainerURN, ResourceURN)
    RemoveResource(ResourceContainerURN, ResourceURN)
    Authorize(ResourceURN)

A CreateResourceContainer(ResourceContainerID) request, in an embodiment, causes the resource container service 106 to create a resource container with the name specified by "ResourceContainerID." Upon receipt of a request, the resource container service 106 may generate the resource container and call the platform data store 112 to store metadata regarding the resource container. In various embodiments, generating the resource container is accompanied by allocating various computing resources, generating various data structures, and/or variations thereof, for the resource container. Generating resource container may also include generating a Uniform Resource Name ("URN"), Uniform Resource Identifier ("URI"), or other identifier to associate with the container. Although the present disclosure describes identifiers associated with resource containers being URNS, it is contemplated that other types of identifiers usable for identifying the particular resource container may be used. The metadata stored in the platform data store 112 may include various information regarding the resource container, such as the name of the resource container, the location of the resource container, the URN corresponding to the resource container, and/or variations thereof. The resource container service 106 may return a URN corresponding to the newly generated resource container. The resource container service 106 may call the platform data store 112 through one or more interfaces, and may utilize one or more APIs.

A PutPolicy(ResourceContainerURN, Policy) request, in an embodiment, causes the resource container service 106 to apply a policy, specified by "Policy," to a resource container, specified by the resource container name, "ResourceContainerURN." In some examples, a "policy" is an access policy comprising information that defines permissions and constraints on users, applications, and other entities to access computing resources. Policy, as specified in the API call, may indicate a data object such as a string or a sequence of bits that comprises policy information that specifies the access policies of a resource container. Policy may also indicate an identifier that identifies policy information that may be stored on one or more data stores. For example, Policy may denote that only a specific set of users are permitted to access the resource container. Upon receipt of a request, the resource container service 106 may call the platform data store 112 to store the Policy along with the metadata stored for the resource container specified by ResourceContainerURN. In various embodiments, the Policy itself may be stored, or various other data representations of the policy information that Policy comprises may be stored in place of Policy. In some examples, the platform data store 112 may associate Policy with the resource container in a database that the platform data store 112 may comprise; the database may indicate that the Policy is a resource container policy of the resource container.

An AttachResource(ResourceContainerURN, ResourceURN) request, in an embodiment, causes the resource container service 106 to attach a resource, specified by a name such as ResourceURN, to a resource container, specified by a name corresponding to the container, such as ResourceContainerURN, to which the resource is to be attached. Upon receipt of a request, the resource container service 106 may determine if the resource identified by ResourceURN exists. In some examples, ResourceURN may be an identifier that specifies a resource that exists on various other systems and or services, such as a key management service, a database service, a computing resource service, a storage service, and/or variations thereof.

In some embodiments, the URN can be a resource located external (e.g., with a third party provider) to the computing resource service provider that provides the resource container service. Additionally or alternatively, the ResourceURN may also specify another resource container; in this manner, the policies associated with the ResourceURN may also govern the resources assigned to the other resource container. The resource container service 106 may call the platform data store 112 to store ResourceURN along with the other data stored for the resource container specified by ResourceContainerURN. In some examples, the platform data store 112 may associate ResourceURN with the resource container in a database that the platform data store 112 may comprise; the database may indicate that the resource specified by ResourceURN is part of the resource container.

A RemoveResource(ResourceContainerURN, ResourceURN) request, in an embodiment, causes the resource container service 106 to remove a resource, specified by ResourceURN, from a resource container specified by ResourceContainerURN. Upon receipt of a request, the resource container service 106 may call the platform data store 112 to delete ResourceURN from the data the platform data store 112 has stored in association with the resource container specified by ResourceContainerURN, or otherwise indicate that the resource corresponding to the ResourceURN is no longer to be associated with the resource container ResourceContainerURN (e.g., set a status flag to inactive or false, store a deactivation timestamp, etc.). In some examples, the platform data store 112 may dissociate ResourceURN from the resource container in a database the platform data store 112 may comprise; the database may indicate that resource specified by ResourceURN is not part of the resource container.

An Authorize(ResourceURN) request, in an embodiment, causes the resource container service 106 to determine if the user submitting the request is authorized to access the resource specified by ResourceURN. Upon receipt of a request, the resource container service 106 may call the platform data store 112 to determine information regarding the resource. In some examples, the platform data store 112 may return policy information regarding the resource container the resource specified by ResourceURN is in. The resource container service 106 may determine, based on the policy information, if the user submitting the request is authorized to access the resource. The resource container service 106 may return an indication that the user is allowed or denied access to the resource.

The platform data store 112 may implement a request API, which, in an embodiment, is an API configured for requesting operations to be performed by the platform data store 112. In some examples, the request API may be configured with the following high-level requests available:

CreateResourceContainer(ResourceContainerURN)
    StorePolicy(ResourceContainerURN, Policy)
    LinkResourceToResourceContainer(ResourceContainerURN, ResourceURN)

GetResourcePolicyAndResourceContainerinfo(ResourceURN)

GetResourceContainerMetadata(ResourceContainerURN)

A CreateResourceContainer(ResourceContainerURN) request, in an embodiment, causes the platform data store 112 to store the URN specified by ResourceContainerURN. Upon receipt of a request, the platform data store 112 may allocate storage space for the resource container specified by ResourceContainerURN." The platform data store 112 may store ResourceContainerURN in the allocated space such that the storage space may be located in the platform data store 112 by the URN ResourceContainerURN." The allocated storage space may be allocated on the platform data store 112, which may comprise a database that may be utilized to locate the allocated storage space.

A StorePolicy(ResourceContainerURN, Policy) request, in an embodiment, causes the platform data store 112 to associate the policy specified by Policy with the resource container specified by ResourceContainerURN. In some examples, Policy may indicate a data object such as a string or a sequence of bits that comprises policy information that specifies the access policies of a resource container. The Policy may also be an identifier that identifies policy information that may be stored on one or more data stores. For example, the Policy may denote that only a specific set of users are permitted to access a resource container. Upon receipt of a request, the platform data store 112 may locate the storage space allocated for the resource container with the URN, ResourceContainerURN, and store the Policy in the allocated storage space. The platform data store 112 may associate the Policy with the resource container in a database that the platform data store 112 may comprise; the database may indicate that the Policy is a resource container policy of the resource container.

A LinkResourceToResourceContainer(ResourceContainerURN, ResourceURN) request, in an embodiment, causes the platform data store 112 to link the resource specified by ResourceURN with the resource container specified by ResourceContainerURN. Upon receipt of the request, the platform data store 112 may locate the storage space allocated for the resource container with the URN ResourceContainerURN, and store ResourceURN in the allocated storage space. In some examples, the platform data store 112 may associate ResourceURN with the resource container in a database the platform data store 112 may comprise; the database may indicate that the resource specified by ResourceURN is part of the resource container.

A GetResourcePolicyAndResourceContainerinfo(ResourceURN) request, in an embodiment, causes the platform data store 112 to return policy and other information regarding the resource container that the resource specified by ResourceURN is part of. Upon receipt of the request, the platform data store 112 may locate the allocated storage space for the resource container that contains the resource specified by ResourceURN, and retrieve the associated policy stored for the resource container as well as any policies stored that are associated with the resource itself. In some examples, there may be no policies stored, in which the platform data store 112 may return an error indicating such. The platform data store 112 may return the policy files, an indication regarding the policies, a summary of the policies, and/or variations thereof. The platform data store 112 may also return additional information, such as metadata, tags, and/or variations thereof.

A GetResourceContainerMetadata(ResourceContainerURN), in an embodiment, causes the platform data store 112 to return metadata regarding the resource container specified by ResourceContainerURN. Upon receipt of the request, the platform data store 112 may locate the storage space allocated for the resource container specified by ResourceContainerURN, and return metadata associated with the resource container. The metadata may include information such as tags, access policies, usage, location, and/or variations thereof. In some examples, if the resource container specified by ResourceContainerURN does not exist, the platform data store 112 may return an error indicating such.

In some examples, the resource container service 106 and platform data store 112 may be provided by a computing resource service provider, in which the request API implemented by the platform data store 112 may be an internal API utilized only by other services, such as the resource container service 106, of the computing resource service provider. It should be noted that, in various embodiments, the request APIs might be implemented in various ways, with various high-level requests such as the high-level requests discussed above or variations thereof, and with various parameters such as the parameters discussed above or variations thereof. Various implementations may implement various forms of the above discussed request APIs; for example, in any particular implementation, there may be more or fewer APIs and the APIs may have different names, have more or fewer parameters, and may have parameters not necessarily described in the present disclosure. Consequently, other variations of request APIs are considered as being part of the present disclosure.

The resource container client 110 may be a collection of computing resources, physical and/or virtual, configured to provide information about various resources that a resource container may comprise. In various embodiments, the resource container client 110 may comprise one or more instances of a physical computing instance, such as a physical server computer, or one or more instances of a virtual computing instance, such as a virtual machine, which may be hosted on one or more computer servers. The resource container client 110 may operate in response to an API request, such as the API request: GetResourcePolicyAndResourceContainerinfo(ResourceURN), in which the resource container client 110 may pass the API request to another service, such as the platform data store 112, and respond with the information provided from the service. The resource container client 110 may provide information such as metadata, resource policies, tags, and/or variations thereof.

The authorization runtime client 108 may be a collection of computing resources, physical and/or virtual, configured to authorize access to various resources that a resource container may comprise. In various embodiments, the authorization runtime client 108 may comprise one or more instances of a physical computing instance, such as a physical server computer, or one or more instances of a virtual computing instance, such as a virtual machine, which may be hosted on one or more computer servers. The authorization runtime client 108 may utilize various computing logic schemes and tests to determine, based on input information, if a customer is authorized to access a specific resource. The authorization runtime client 108 may operate in response to an API request, such as the API request: Authorize(ResourceURN). Further information regarding authorization can be found in the descriptions of FIGS. 5 and 6.

Figure 2:
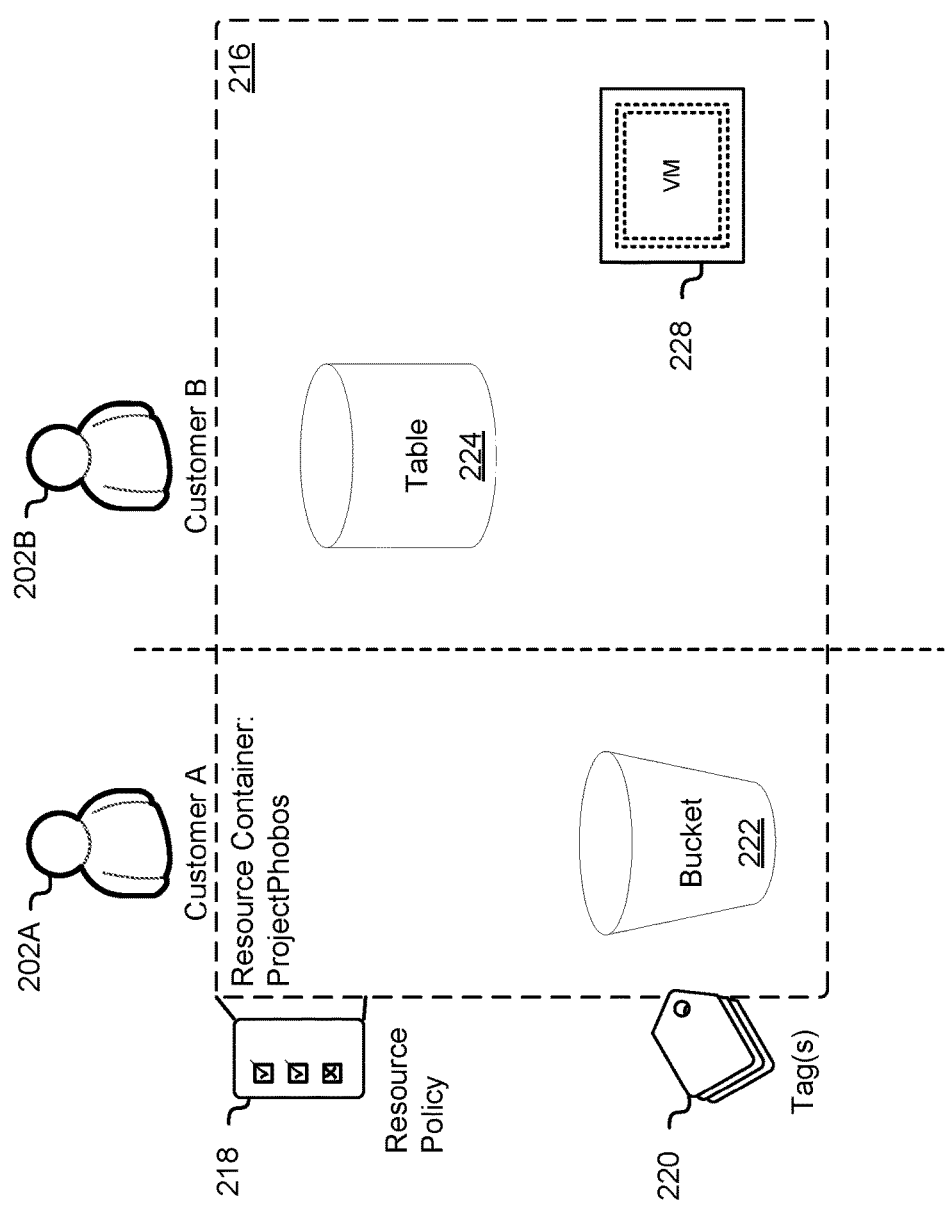
FIG. 2 illustrates an example of a resource container, in accordance with an embodiment.

FIG. 2 illustrates an example 200 of a resource container as may be produced using the resource container service 106 of FIG. 1. As illustrated in FIG. 2, the example 200 may include a customer A 202A and a customer B 202B, which may share a resource container 216 comprising resources, including a bucket 222, table 224, and virtual machine ("VM") 228. The resource container 216 may have an associated resource policy 218 and associated tags 220.

The customer A 202A and customer B 202B may be any entities operable to access systems and/or services such as the resource container 216. In embodiments, each of the customers A 202A and B 202B are associated with separate customer accounts of a computing resource service provider that provides one or more resources (e.g., the bucket 222, the table 224, the VM 228, etc.) to its customers and/or provides a resource container service such as the resource container service 106 of FIG. 1 for use by its customers. For example, the customer A 202A may be an owner of "Account 123" with the computing resource service provider and the customer 202B may be an owner of "Account 456" with the computing resource service provider, with each account being allocated different computing resources and potentially being subscribed to different services provided by the computing resource service provider.

The customers may be individuals, groups of individuals, business entities or other organizations that have a business relationship with the computing resource service provider of the various systems and/or services. In an embodiment, the computing resource service provider provides services that may include providing data structures such as the resource container 216.

The bucket 222 may be an object data store that an on-demand storage service hosts; the on-demand data storage service may be a collection of computing resources configured to synchronously process requests to store and/or access data. The on-demand data storage service may allow data to be provided in responses to requests for the data and may operate using computing resources (e.g., databases) that enable the on-demand data storage service to locate and retrieve data quickly. For example, the on-demand data storage service may maintain stored data in a manner such that, when a request for a data object is retrieved, the data object can be provided (or streaming of the data object can be initiated) in a response to the request. As noted, data stored in the on-demand data storage service may be organized into data objects. The data objects may have arbitrary sizes except, perhaps, for certain constraints on size. Thus, the on-demand data storage service may store numerous data objects of varying sizes. The on-demand data storage service may operate as a key value store that associates data objects with identifiers of the data objects that may be used by the customer A 202A to retrieve or perform other operations in connection with the data objects stored by the on-demand data storage service. The bucket 222 may be provided by the on-demand storage service and may be managed by the customer A 202A.

The VM 228 may be a virtual machine and/or a virtual machine instance. In some examples, the term "virtual machine" refers to an emulation, in software and/or hardware of a physical computer system, such that software executing in the virtual machine environment behaves as if the virtual machine were a physical computer. In some examples, the term "virtual machine instance" refers to a virtual machine that is instantiated and executing on a host computer system. The virtual machine instances may be used for various purposes, such as to operate as servers supporting a website, to operate business applications or, generally, to serve as compute power for the customer. Other applications for the virtual machine instances may be to support database applications, electronic commerce applications, business applications, and/or other applications. The VM 228 may be provided by a virtual computing system service, and may be managed by the customer B 202B. The table 224 may be an organized collection of data, such as a table, query, report, view, and other objects. The table 224 may be provided by a database service and may be managed by the customer B 202B.

In the example 200, the customer A 202A is the creator and/or administrator of the resource container 216. The customer A 202A may submit an appropriately configured API request to a service, such as the resource container service 106 as described in connection with FIG. 1, to instantiate the resource container 216. The resource container 216 may be generated through a CreateResourceContainer(ResourceContainerID) API request configured with the following parameters: CreateResourceContainer(ProjectPhobos). The resource container 216 may be identified with a URN, which in the example 200 is denoted/represented by "ProjectPhobosURN." The customer A 202A may also attach the resource policy 218 to the resource container 216. The customer A 202A may submit an appropriately configured API request to a service, such as the resource container service 106 as described in connection with FIG. 1, to associate the resource policy 218 to the resource container 216. The resource policy 218 may be associated with the resource container 216 through an API request such as a PutPolicy(ResourceContainerURN, Policy) API request configured with the following parameters: PutPolicy(ProjectPhobosURN, policy1); the resource policy 218 may be specified by "policy1." The resource policy 218 may be a set of policies that dictate access to the resource container 216 (e.g., the resource policy 218 can denote a specific set of users that are authorized to access the resource container 216).

The resource policy 218 may be time-based (e.g., the resource policy 218 can have an expiration time or the resource policy 218 can denote specific times that specific sets of users are authorized to access the resource container 216), location-based (e.g., the resource policy 218 can denote specific locations that specific sets of users are authorized to access the resource container 216), Internet Protocol (IP) address-based (e.g., the resource policy 218 can denote specific IP addresses of specific sets of users that are authorized to access the resource container 216), 2-factor authentication-based (e.g., the resource policy 218 can denote specific additional authentication processes that specific sets of users must complete to access the resource container 216), restrictions based on network type (e.g., the entity must be communicating through a virtual private network or virtual private cloud), context-based (e.g., the resource policy 218 can denote specific contexts that specific sets of users are authorized to access the resource container 216), and/or variations thereof.

The tags 220 may be a data object such as a sequence of bits that indicates various aspects of the resource container 216. That is, the tags 220 may be a label that is associated, by one of the customers 202A-202B, with a resource that specifies information about the resource. For example, the table 224 may be assigned the tag "developers" and the bucket 222 may be assigned the tag "administrators." The resource policy 218 may specify that only users between Accounts 123 and 456 having the role of "developer" can have access to resources tagged for "developers," and likewise the resource policy 218 may specify that only users between Accounts 123 and 456 having the role of "administrator" can have access to resources tagged for "administrators." In this manner, the tags 220 may be used to provide more customizable and granular access. The tags 220 may be generated as part of the instantiation of the resource container 216. The tags 220 may be configured to comprise information such as the size of various resources, the location of various resources, various identifiers, and/or variations thereof. The tags 220 may be generated as part of the generation of the resource container 216. The tags 220 may be updated periodically or aperiodically based upon the status and content of the resource container 216.

As shown in the example 200, the customer A 202A may attach the bucket 222 to the resource container 216. The customer A 202A may utilize an appropriately configured API request, such as an AttachResource(ResourceContainerURN, ResourceURN) request configured with the following parameters: AttachResource(ProjectPhobosURN, BucketPhobos) to attach the bucket 222; in the example 200, the bucket 222 is specified by the URN: "BucketPhobos." The resource policy 218 may specify that the customer B 202B may access the resource container 216. The resource policy 218 may further specify that the customer B 202B may add resources to the resource container 216; additionally, the resource policy 218 may specify constraints on the customer B 202B, such as restricting the resources the customer B 202B may add to the resource container 216. In some examples, the customer B 202B may be restricted to only adding database or virtual machine based resources to the resource container 216.

In embodiments, the customer A 202A may specify in the resource policy 218 that the customer B 202B may add resources from his/her own account (e.g., Account 456) to the resource container 216. The customer B 202B may attach the table 224 and VM 228 to the resource container 216 via various API requests. The table 224 may be attached with the following API request: AttachResource(ProjectPhobosURN, TablePhobos) to attach the table 224; in the example 200, the table 224 is specified by the URN: "TablePhobos." The VM 228 may be attached with the following API request: AttachResource(ProjectPhobosURN, VMInstancePhobos) to attach the VM 227; in the example 200, the VM 228 is specified by the URN: "VMInstancePhobos."

In this manner, the resource container 216 may be configured to allow different customers of a computing resource service provider to share resources with each other and collaborate on a common project. Furthermore, the policies (e.g., the resource policy 218) associated with the resource container 216 may be written to automatically apply to multiple resources, or to certain types of resources, associated with the resource container 216. In this manner, managing policies for resources associated with the resource container 216 is simplified from otherwise having to associate separate policies from different accounts with individual resources.

In some examples, the customer A 202A may configure the resource policy 218 such that the customer B 202B may access the resource container 216. The customer A 202A may configure the resource container policy with the following high-level code:

```
{
    "Version": "2022-10-17",
    "Statement": [
    {
        "Sid": "AddPermissionsFor456",
        "Effect": "Allow",
        "Principal":
        {
            "WS": "urn:ws:ident:456:user/Bob"
```

```
        },
        "Action": [
            "RCs:AttachResource"
        ],
        "Resource":
            "urn:ws:RCs:location-1:123:resourcecontainer/ProjectPhobos"
        ],
        "Condition":
        {
            "UrnLike":
            {
                "RCs:resourceURN": [
                    "urn:ws:db:location-1:456:table/*",
                    "urn:ws:vm:location-1:456:instance/*"
                ]
            }
        }
    }
    ]
}
```

The resource policy 218 may comprise one or more constraints on access to a resource. Such constraint may constrain usage of the resource based on various factors, such as user, user role, location, or time. For example, some countries have specific laws regarding whether and what kind of information that can be communicated out of or into the country. In such cases, the resource policy 218 may specify to allow or deny access to a resource located within a particular geographic region. The resource policy 218 in such a case may be further specified to be dependent on whether the entity seeking access (e.g., the customer A 202A or the customer B 202B) is itself located within or is a resident of the particular geographic region. Evaluating such policy may include a resource container service, such as the resource container service 106 of FIG. 1, determining the physical location of the resource (e.g., for example determining the physical location based on a location indicated by the URN of the resource), and determining whether to allow or deny access to the resource based on whether the physical location is located in a different geographic region from the geographic region specified by the policy.

As another example, the resource policy 218 may be configured with a time-based constraint. For example, the customer A 202A may submit a request to the resource container service to associate a policy with the resource container 216 that specifies that access to the bucket 222 is only allowed between 8:00 AM and 9:00 PM on weekdays. Or, in another implementation, the customer B 202B may submit a request to the resource container to associate a policy with the table 222 to specify that access to table 224 expires on a particular date. In this manner, when the resource container service (e.g., the resource container service 106 of FIG. 1) determines whether an entity has access to a requested resource, the resource container service may determine whether the request and the requestor are in compliance with the time-based condition (e.g., within the allowed time range, that the access has not expired, etc.).

Referring to the above code, "Version" may denote the version of the resource container policy, and "Statement" may be utilized to denote a specific policy of the resource container policy. The resource container policy may comprise various policies of the resource container policy, each separated with the heading "Statement," "Sid," or statement id, may be an identifier generated by the customer A 202A to denote the specific policy of the "Statement," which in this case is permissions for the customer B 202B (e.g., "AddPermissionsFor456"), associated with Account 456. "Principal" may denote the user the specific policy pertains to, which may be a user of the Account 456, which may be operated by a user "Bob." "Action" may denote the action or functionality the specific policy pertains to, which in this case is the attach resource functionality, in the form of "RCs:AttachResource." "Resource" may denote the resource container the specific policy applies to, which in this case is "ProjectPhobos." "Condition" may specify various facets of the specific policy, such as the resources the user is permitted to add. In this case, "RCs:resourceURN" specifies that the user may only add "db" corresponding to databases, and "vm" corresponding to virtual machines, that are managed by the user, which in this case is the Account 456. "Effect" may denote that the status of the "Action" of the specific policy; in this case, the functionality or action denoted by "Action" is allowed, denoted by "Allow." It should be noted that, in various embodiments, resource container policy configuration and policies might be implemented in various forms, utilizing various computing programming languages; the above example is intended to be an illustrative example and may vary based on specific implementations.

In some embodiments, services and resources may be assigned to more than one additional resource container. For example, the VM 228 may not only be assigned to ProjectPhobos, but also to a ProjectDeimos (not pictured) resource container, which may be shared with additional customer C (also not pictured). In this example, the additional customer C may have a separate account (e.g., Account 789) with the computing resource service provider from the accounts of the customer A 202A and the customer B 202B (e.g., lacking access to Account 123 and Account 456, respectively). Consequently, customer A 202A may not have access to the ProjectDeimos resources, other than those that may already be accessible either through ProjectPhobos or already associated with Account 123 of customer A 202A. However, because the VM 228 in this example is associated with both ProjectPhobos and ProjectDeimos, the VM 228 may be accessible to each of the customers A 202A, B 202B, and C. However, in this example, the table 224 is not associated with ProjectDeimos, and consequently the additional customer C may be denied access to the table 224.

It should be noted that, in various embodiments, access to a resource that is assigned to multiple resource containers may be constrained by one or more policies of the policies of the multiple resource containers. In some examples, all of the policies of the multiple resource containers may be utilized to constrain access to the resource. In some examples, only certain policies of the multiple resource containers may be utilized to constrain access to the resource. For example, in an embodiment, the particular project that an entity requesting access to the resource is a factor that determines which policy of the policies of the multiple resource containers is applied to the entity. In another example, the resource containers may have a hierarchy, whereby the governing policy for a resource is determined by where the resource container associated with the policy falls in the hierarchy (e.g., policies of a parent resource container may trump conflicting policies of a child resource container, or vice-versa). In various examples, the entity requesting access to the resource, the context surrounding the request to access the resource, and/or variations thereof, may be utilized determine which resource policy of the multiple resource policies of the multiple resource containers is utilized to constrain access to the resource.

Alternatively, in some embodiments, a service or resource associated with a first resource container may be disallowed from being associated with a second resource container unless the service or resource is first disassociated (e.g., by the resource owner or by the resource container owner) from the first resource container. In some examples, a resource container owner refers to a customer (e.g., the customer A 202A) that created and/or administrates the particular resource container.

Figure 3:
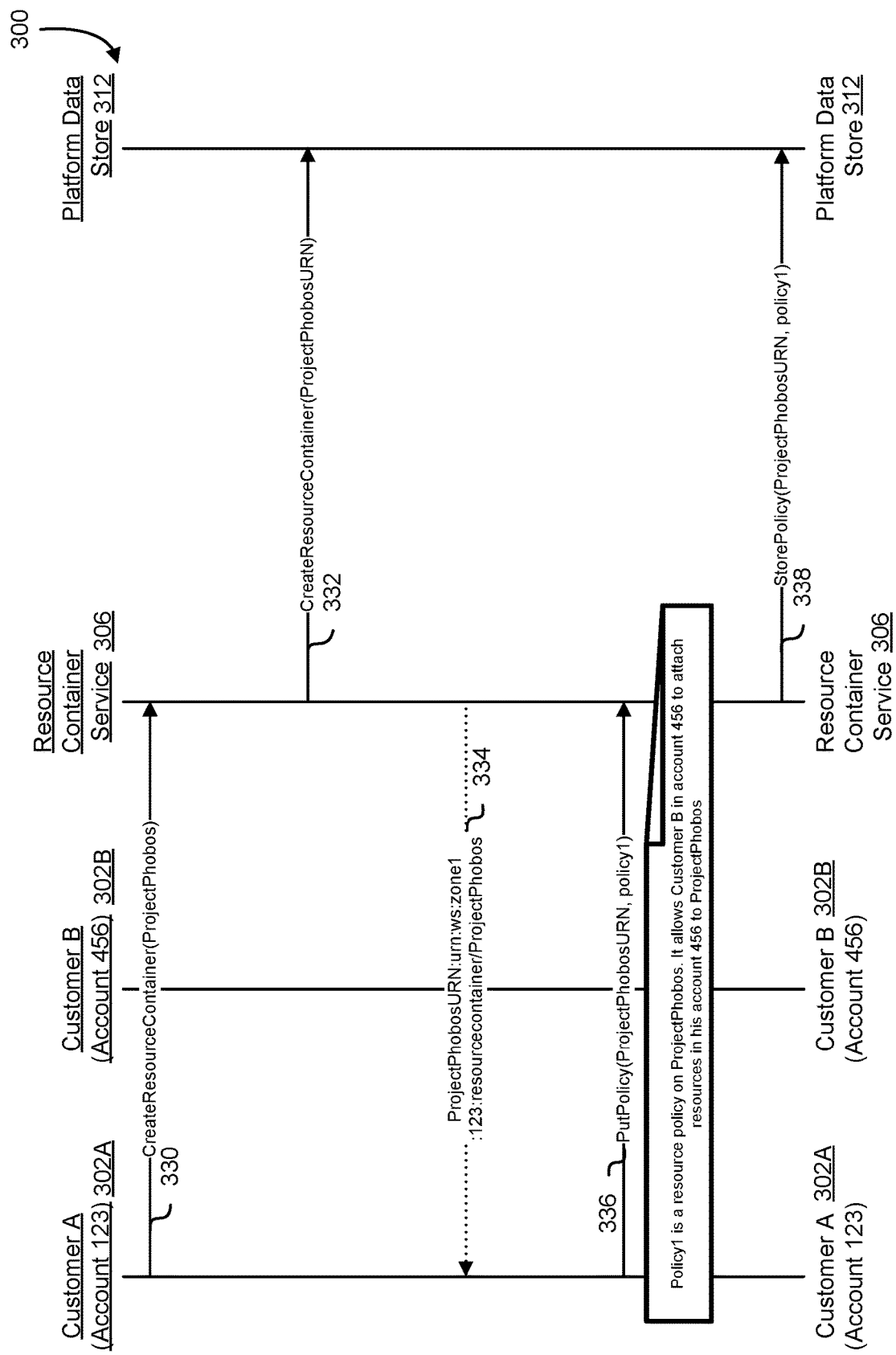
FIG. 3 is a swim diagram illustrating an example of a process for creating a resource container, in accordance with various embodiments.

FIG. 3 is a swim diagram illustrating an example of a process 300 for creating a resource container in accordance with various embodiments. Some or all of the process 300 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). The swim diagram of FIG. 3 illustrates a process that might be followed to create a resource container for the "ProjectPhobos" example 200 illustrated in FIG. 2; thus some of the details, such as the particular URN and variable names, are meant to be illustrative only, and may vary in practice based on the particular resource container, resources, or implementation of the techniques of the present disclosure.

Figure 8:
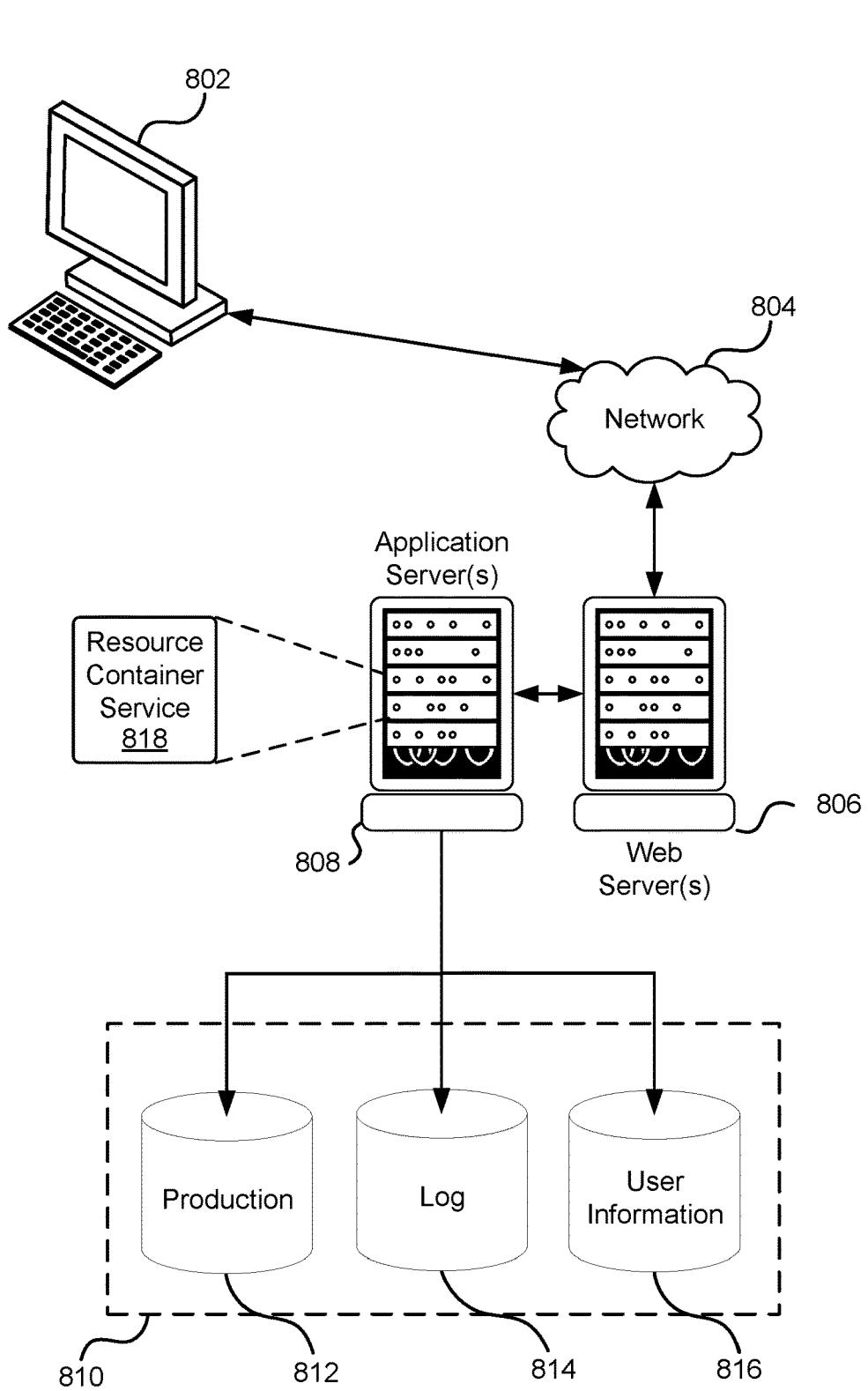
FIG. 8 illustrates a system in which various embodiments can be implemented.

For example, some or all of process 300 may be performed by any suitable system, such as a server in a data center, by various components of the system 800 described in conjunction with FIG. 8, such as the web server 806 or the application server 808, by multiple computing devices in a distributed system of a computing resource service provider, or by any electronic client device such as the electronic client device 802. In an embodiment, a customer A 302A and customer B 302B are the same as the customer 202A and customer 202B, respectively, as described in connection with FIG. 2. Furthermore, in an embodiment, a resource container service 306 and platform data store 312 are the same as the resource container service 106 and platform data store 112, respectively, as described in connection with FIG. 1. The customer A 302A and customer B 302B may communicate to the resource container service 306 through various networks, such as the Internet. The process 300 includes a series of operations wherein a resource container request is created. The customer A 302A may submit an appropriately configured API request 330 to the resource container service 306 to create a resource container. The API request 330 may comprise the CreateResourceContainer (ResourceContainerID) request configured with the following parameters: CreateResourceContainer(ProjectPhobos), in which "ProjectPhobos" may be a variable value that corresponds to a resource container identifier (e.g., ResourceContainerID described above). In this manner, the customer A 302A may create a resource container for the Phobos project shown in the example 200 of FIG. 2 utilizing the following API request: CreateResourceContainer(ProjectPhobos).

The resource container service 306 may receive the API request 330, create the specified resource container, and store the metadata regarding the created resource container in the platform data store 312. The resource container service 306 may create the resource container by creating a data structure and associating computing resources with the resource container. The resource container service 306 may also generate metadata as part of creating the resource container. The metadata may include various information regarding the created resource container, such as identifying information, a URN, characteristics of the resource container, size, location, and/or variations thereof. For example, the URN of the created resource container may be the URN 334, (e.g., "ws:zone1123:resourcecontainer/ProjectPhobos" is presented as an illustrative example in FIG. 3), which may be returned to the customer A 302A. The resource container service 306 may store the URN of the created resource container, which may be the value of the variable ProjectPhobosURN, in the platform data store 312. In an embodiment, the resource container service 306, following the receipt of the API request 330, creates a resource container designated as "ProjectPhobos" that has the URN "ProjectPhobosURN:urn:ws:zone1123:resourcecontainer/ProjectPhobos," which may be represented by ProjectPhobosURN in the illustrative example shown in FIG. 3, and stores the URN in the platform data store 312.

Like the resource container service 306, the platform data store 312 may implement an internal request API to be utilized by the resource container service 306. Further information regarding the internal request API may be found in the description of FIG. 1. The URN may be stored in the platform data store 312 by the resource container service 306 with the API request 332, configured as the following API request: CreateResourceContainer(ProjectPhobosURN), in which the platform data store 312 may allocate storage for the resource container specified by ProjectPhobosURN, and store ProjectPhobosURN in the allocated storage. The URN 334 may be returned to the customer A 302A. In an embodiment, the platform data store 312 allocates storage space for a resource container, specifically the resource container with the URN represented by ProjectPhobosURN, and stores the URN in the allocated storage space.

The customer A 302A may submit an appropriately configured API request 336, which may be configured as the following API request: PutPolicy(ProjectPhobosURN, policy1), to the resource container service 306 to associate the policy, specified by "policy1" with the resource container specified by ProjectPhobosURN. The resource container service 306 may receive the API request 336, and retrieve the policy information indicated by policy1. The resource container service 306 may utilize an API request 338 configured as the following API request: StorePolicy (ProjectPhobosURN, policy1) to store policy1 in the platform data store 312. In some examples, policy1 may be a data object such as a string that comprises policy information, or an identifier that identifies policy information that may be stored on one or more data stores. The policy1 may be a policy that declares one or more customers or users of the customer accounts to be authorized participants in the project associated with the resource container. For example, in the example depicted in FIG. 3, policy1 is a resource policy for ProjectPhobos that allows the customer B 302B in Account 456 to attach resources associated with Account 456 to ProjectPhobos. The policy1 may further specify one or more entities which are authorized to access which of the resources and/or which types of resources associated with the resource container. In this manner, servicing a request to access a resource associated with the resource container may involve the resource container service making a determination based on the authorized participants and policy1 whether the entity requesting access should be allowed or denied access to the requested resource.

The platform data store 312 may receive the API request 338, locate the storage space allocated for the resource container specified by ProjectPhobosURN, and store policy1 in the allocated storage space. In an embodiment, the resource container service 306 receives a request to associate a policy, specified by policy1, with a resource container, specified by the URN, ProjectPhobosURN, identifies/retrieves the policy, and utilizes an internal API request to store the policy in the allocated storage space for the resource container within the platform data store 312.

Figure 4:
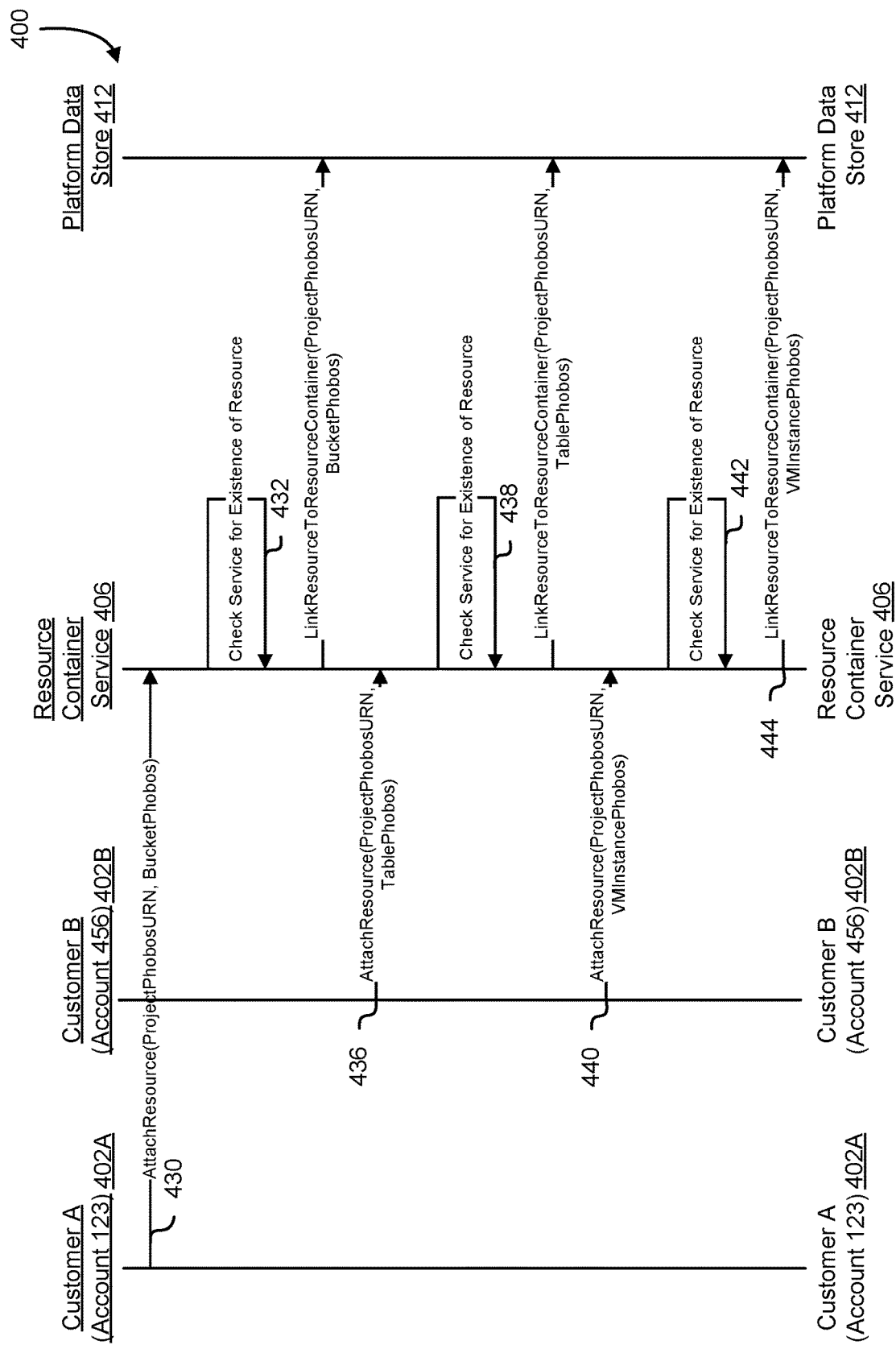
FIG. 4 is a swim diagram illustrating an example of a process for adding resources to a resource container, in accordance with various embodiments.

FIG. 4 is a swim diagram illustrating an example of a process 400 for adding resources to a resource container in accordance with various embodiments. Some or all of the process 400 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). The swim diagram of FIG. 4 illustrates a process that might be followed to attach the resources illustrated in FIG. 2 to the resource container for the "ProjectPhobos" example 200; thus some of the details, such as the particular URN and variable names, are meant to be illustrative only, and may vary in practice based on the particular resource container, resources, or implementation of the techniques of the present disclosure.

For example, some or all of process 400 may be performed by any suitable system, such as a server in a data center, by various components of the system 800 described in conjunction with FIG. 8, such as the web server 806 or the application server 808, by multiple computing devices in a distributed system of a computing resource service provider, or by any electronic client device such as the electronic client device 802. In an embodiment, customer A 402A, customer B 402B, resource container service 406, and platform data store 412 are the same as the customer A 302A, customer B 302B, resource container service 306, and platform data store 312, respectively, as described in connection with FIG. 3. The process 400 includes a series of operations wherein resources are added to a resource container.

The customer A 402A may have access to various services and resources associated with the Account 123 the customer A 402A has with a computing resource service provider, but not be associated with the Account 456 of the customer B 402B. The customer B 402B may have the separate Account 456, associated with separate services and resources. Consequently, the customer B 402A may not normally have access to any of the resources associated with Account 123. The customer A 402A may desire to add such resources to a resource container in order to allow the customer B 402B to access such resources. The customer A 402A may desire to attach a resource, specified by a URN "BucketPhobos," to a resource container, specified by a URN, ProjectPhobosURN. The customer A 402 may submit an appropriately configured API request 430, which may be configured as the following API request: AttachResource(ProjectPhobosURN, BucketPhobos), in which ProjectPhobosURN may specify the URN of the resource container, and BucketPhobos may specify the URN of the resource. The resource container service 406 may receive the API request 430, and determine if the resource exists 432. In some examples, the resource container service 406 may communicate with the service that provides the resource to determine if the resource exists. The resource container service 406 may determine the existence of the resource utilizing the URN of the resource. For example, the resource container service 406 may determine that the resource corresponding to BucketPhobos is a data store, which may be provided by an object data store service. Continuing with the example, the resource container service 406 may access the object data store service, and determine if the resource specified by BucketPhobos exists by utilizing various databases the object data store service may comprise.

In an embodiment, the resource container service 406 receives an API request 430 to attach a resource, specified by BucketPhobos, to a resource container, specified by Project-PhobosURN, determines if the resource exists, and utilizes an internal API request to the platform data store 412 to attach the resource to the resource container. In some examples, the internal API request may be configured as the following request: LinkResourceToResourceContainer(ProjectPhobosURN, BucketPhobos), in which ProjectPhobosURN specifies the resource container, and BucketPhobos specifies the resource. The platform data store 412 may locate the storage space allocated for the resource container, and store a link to the resource, which may be a URN such as BucketPhobos, and/or variations thereof.

The customer B 402B may have access to various services and resources associated with the Account 456, but not associated with the Account 123 of customer A 202A. Consequently, the customer A 402A may not normally have access to any of the resources associated with Account 456. The customer B 402B may desire to add such resources to a resource container in order to allow the customer A 402A to access such resources. The customer B 402B may desire to attach a resource, specified by a URN "TablePhobos," to a resource container, specified by a URN, ProjectPhobosURN. In an embodiment, an owner of the resource container (e.g., the customer A 402A) may have associated a policy with the resource container that grants the customer B 402B access to add or remove resources from the resource container from Account 456 of the customer B 402B.

In this manner, the customer B 402B may submit an appropriately configured API request 436, which may be configured as the following API request: AttachResource(ProjectPhobosURN, TablePhobos), in which ProjectPhobosURN may specify the URN of the resource container, and TablePhobos may specify the URN of the resource. The resource container service 406 may receive the API request 436, and determine if the resource exists 438. In some examples, the resource container service 406 may communicate with the service that provides the resource to determine if the resource exists. The resource container service 406 may determine the existence of the resource utilizing the URN of the resource.

In an embodiment, the resource container service 406 receives an API request 436 to attach a resource, specified by TablePhobos, to a resource container, specified by Project-PhobosURN, determines if the resource exists, and utilizes an internal API request to the platform data store 412 to attach the resource to the resource container. In some examples, the internal API request may be configured as the following request: LinkResourceToResourceContainer(ProjectPhobosURN, TablePhobos), in which ProjectPhobosURN specifies the resource container, and TablePhobos specifies the resource. The platform data store 412 may locate the storage space allocated for the resource container, and store a link to the resource, which may be a URN such as TablePhobos, and/or variations thereof.

The customer B 402B additionally may desire to attach another resource, specified by a URN "VMInstancePhobos," to a resource container, specified by a URN, ProjectPhobosURN. The customer B 402B may submit an appropriately configured API request 440, which may be configured as the following API request: AttachResource(ProjectPhobosURN, VMInstancePhobos), in which ProjectPhobosURN may specify the URN of the resource container, and VMInstancePhobos may specify the URN of the resource. The resource container service 406 may receive the API request 440, and determine if the resource exists 442. In some examples, the resource container service 406 may communicate with the service that provides the resource to determine if the resource exists. The resource container service 406 may determine the existence of the resource utilizing the URN of the resource.

In an embodiment, the resource container service 406 receives an API request 440 to attach a resource, specified by VMInstancePhobos, to a resource container, specified by ProjectPhobosURN, determines if the resource exists, and utilizes an internal API request to the platform data store 412 to attach the resource to the resource container. In some examples, the internal API request may be configured as the following request 444: LinkResourceToResourceContainer (ProjectPhobosURN, VMInstancePhobos), in which ProjectPhobosURN specifies the resource container, and VMInstancePhobos specifies the resource. The platform data store 412 may locate the storage space allocated for the resource container, and store a link to the resource, which may be a URN such as VMInstancePhobos, and/or variations thereof. In an embodiment, customer A 402A and customer B 402B both have access to resources indicated by URN's BucketPhobos, TablePhobos, and VMInstancePhobos, which are part of the resource container indicated by the URN ProjectPhobosURN.

Figure 5:
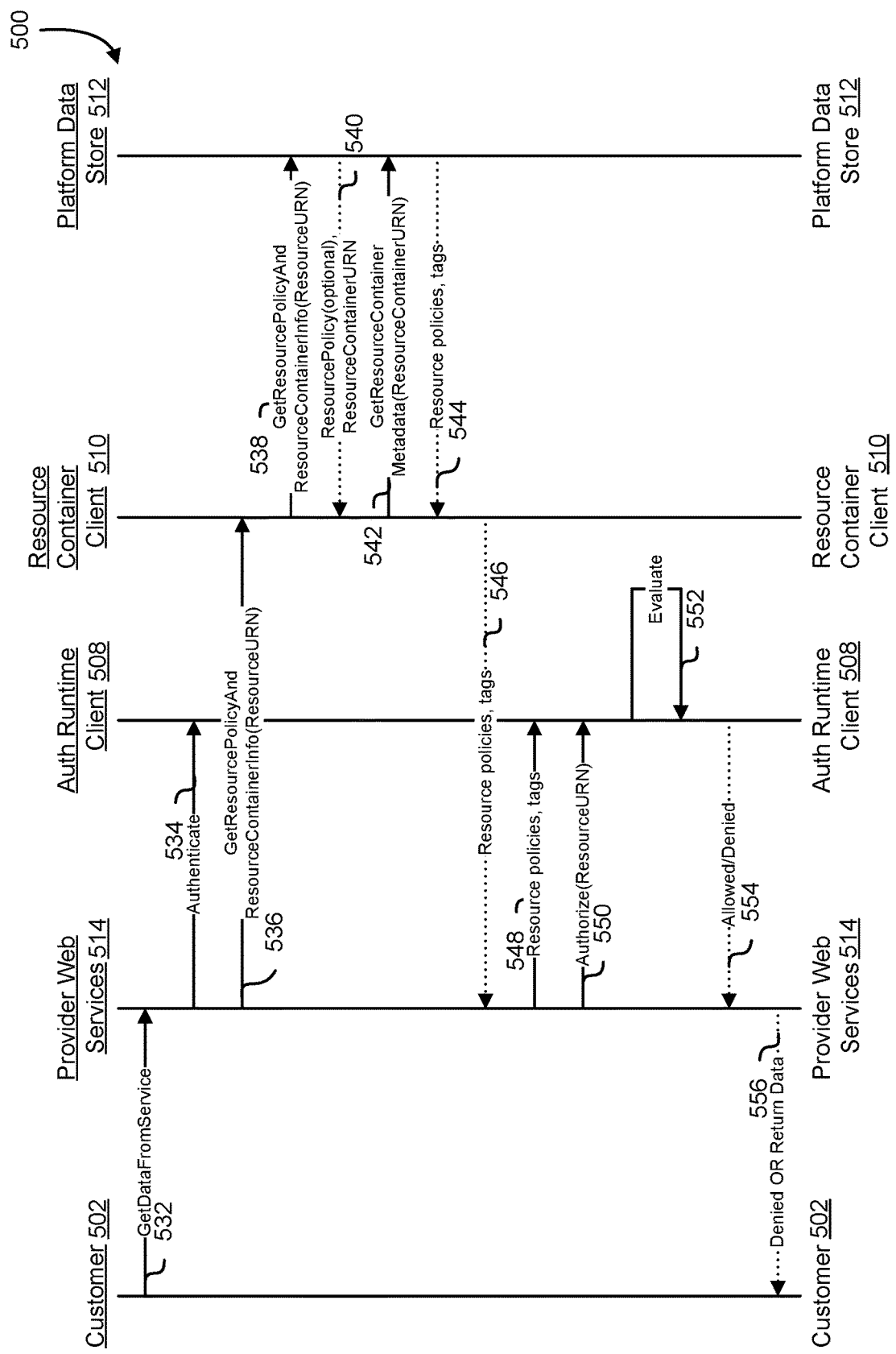
FIG. 5 is a swim diagram illustrating an example of a process for authorization within a resource container, in accordance with various embodiments.

FIG. 5 is a swim diagram illustrating an example of a process 500 for authorization within a resource container in accordance with various embodiments. Some or all of the process 500 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). The swim diagram of FIG. 5 illustrates a process that might be followed to authenticate a customer (e.g., customer A 202A or customer B 202B of FIG. 2) seeking access to a resource assigned to the "ProjectPhobos" example 200; thus some of the details, such as the particular URN and variable names, are meant to be illustrative only, and may vary in practice based on the particular resource container, resources, or implementation of the techniques of the present disclosure.

For example, some or all of process 500 may be performed by any suitable system, such as a server in a data center, by various components of the system 800 described in conjunction with FIG. 8, such as the web server 806 or the application server 808, by multiple computing devices in a distributed system of a computing resource service provider, or by any electronic client device such as the electronic client device 802. In an embodiment, the customer 502, authorization runtime client 508, resource container client 510, and platform data store 512 are the same as the client 102, authorization runtime client 108, resource container client 110, and platform data store 112, respectively, as described in connection with FIG. 1. The process 500 includes a series of operations wherein access to a resource container is authorized.

The customer 502 may desire to access data 532 from the provider web services 514. The data may be a resource from the provider web services 514 that is part of a resource container. For example, the data may be a resource such as a virtual machine instance that is linked to a resource container. In various embodiments, the provider web services 514 are various web services that provide various computing services and resources; such services include services such as data storage services, key management services, object data store services, database services, computing resource services, and/or variations thereof. The provider web services 514 may authenticate 534 the customer's 502 identity. In some examples, the provider web services 514 may authenticate the customer 502 by interfacing with the authorization runtime client 508. The authorization runtime client 508 may provide authentication information regarding the customer 502.

If the customer 502 is determined to be authorized to access the desired data, the provider web services 514 may determine further information regarding the desired data. The provider web services 514 may utilize the appropriately configured API request 536: GetResourcePolicyAndResourceContainerinfo(ResourceURN), in which ResourceURN is a URN that specifies the desired data. The resource container client 510 may receive the API request 536, and, based on the request, utilize internal API request 538 with the received URN ResourceURN as an input parameter. The platform data store 512 may receive the API request 538, and return the URN of the resource container (e.g., ResourceContainerURN) that the resource specified by ResourceURN is part of, as well as the one or more policies of the resource container. The resource container client may further utilize internal API request 542, with the returned URN of the resource container (e.g., ResourceContainerURN) as an input parameter, to the platform data store 512, which may respond with various resource policies and tags regarding the resource container specified by ResourceContainerURN. In an embodiment, the GetResourceContainerMetadata(ResourceContainerURN) API request 540 returns metadata 544, which may comprise resource policies and/or tags regarding the resource container specified by ResourceContainerURN.

The resource container client 510 may provide the resource policies and tags 546 to the provider web services 514, which may provide them to the authorization runtime client 508. The provider web services 514 may provide the resource polices and tags 548 to the authorization runtime client 508 through an appropriately configured API request, or various other interfaces. The provider web services 514 may then submit the API request 550: Authorize(ResourceURN), to determine if, based on the resource policies and tags 548, the customer 502 is authorized to access the resource specified by ResourceURN. The authorization runtime client 508 may evaluate 552 the received resource policies and tags 548. The authorization runtime client 508 may interface with various databases and utilize various computational logic schemes to determine, based on the received resource policies and tags 548, customer 502, and resource specified by ResourceURN, if the customer 502 may access the resource specified by ResourceURN.

The authorization runtime client 508 may allow or deny 554 access for the resource specified by ResourceURN by the customer 502. If access is denied, the provider web services 514 may return 556 an indication that access is denied. If access is allowed, the provider web services 514 may return 556 the resource or access to the resource specified by ResourceURN to the customer 502. Note that, depending on implementation, steps of the process 500 may be performed in a different order, even in parallel, with more or fewer steps from those depicted in FIG. 5. Further, the process 500 may be performed using more, fewer, or different entities than those depicted in the illustrative example.

Figure 6:
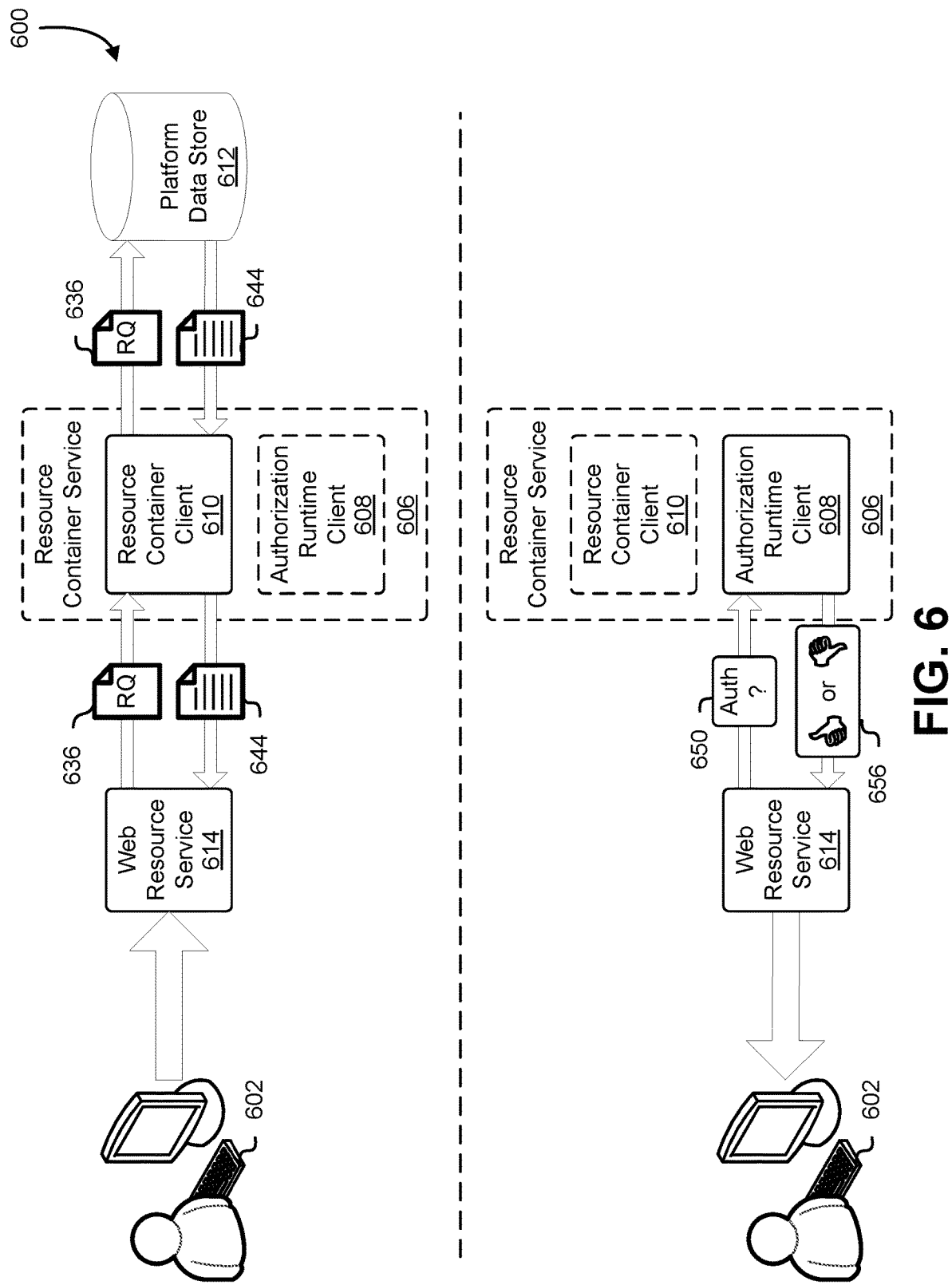
FIG. 6 illustrates an example of authorizing access to a resource of a resource container, in accordance with an embodiment.

FIG. 6 illustrates an aspect of a system 600 in which various embodiments may be practiced. Specifically, the system 600 is an example of a system usable to perform the process 500 of FIG. 5. As illustrated in FIG. 6, the system 600 may include a client 602, which may communicate to a web resource service 614. The web resource service 614 may communicate to a resource container service 606 comprising a resource container client 610 and an authorization runtime client 608. The resource container service 606 may communicate with a platform data store 612.

The client 602 may be any entity operable to access systems and/or services such as the web resource service 614. In some embodiments, the client 602 is a device operated by a customer of a computing resource service provider that hosts one or more of the systems depicted in FIG. 1 and FIG. 6. The customer may be an individual, group of individuals, business entity or other organization that has a business relationship with the computing resource service provider of the various systems and/or services. In an embodiment, the computing resource service provider provides services such as the web resource service 614, resource container service 606, and platform data store 612. In an embodiment, the client 602, web resource service 614, resource container client 610, authorization runtime client 608, and platform data store 612 are the same as the customer 502, provider web services 514, resource container client 510, authorization runtime client 508, and platform data store 512, respectively, as described in connection with FIG. 5.

The client 602 may desire to access a resource from the web resource service 614. The data may be a resource from the web resource service 614 that is part of a resource container. For example, the data may be a resource such as a virtual machine instance that is linked to a resource container. In various embodiments, the web resource service 614 is a collection of various web services that provide various computing services and resources; such services include services such as data storage services, key management services, object data store services, database services, computing resource services, and/or variations thereof. The web resource service 614 may authenticate the client's 602 identity (similar to the operations of 534 of FIG. 5). In some examples, the web resource service 614 may authenticate the client 602 by interfacing with the authorization runtime client 608.

If the client 602 is determined to be authorized to access the desired data, the web resource service 614 may determine further information regarding the desired data. The web resource service 614 may utilize an appropriately configured API request 636 such as the following: GetResourcePolicyAndResourceContainerInfo(ResourceURN), in which ResourceURN is a URN that specifies the desired data, submitted to the resource container client 610 (similar to the operations of 536 of FIG. 5). The resource container client 610 may receive the API request 636, and, provide various aspects of the request 636, such as the URN of the specified desired data, to the platform data store 612 (similar to the operations of 538). The platform data store 612 may return the URN of the resource container (e.g., ResourceContainerURN) that the resource specified by ResourceURN is part of, as well as the one or more policies of the resource container (similar to the operations of 540). The resource container client may further utilize additional internal API requests utilizing the returned URN of the resource container (e.g., ResourceContainerURN) as an input parameter (similar to the operations of 542). In an embodiment, the platform data store 612 returns various resource policies and/or tags 644 regarding the resource container to the resource container client 610 (similar to the operations of 544).

The resource container client 610 may provide the resource policies and/or tags 644 to the web resource service 614 (similar to the operations of 546 of FIG. 5). The web resource service 614 may provide the resource policies and/or tags to the authorization runtime client 608 (similar to the operations of 548). The web resource service 614 may provide the resource polices and tags to the authorization runtime client 608 through an appropriately configured API request 650, or various other interfaces. The authorization runtime client 608 may evaluate the received resource policies and/or tags 644. The authorization runtime client 608 may interface with various databases and utilize various computational logic schemes to determine, based on the received resource policies and/or tags 644, client 602, and resource specified by ResourceURN, if the client 602 may access the resource specified by "ResourceURN."

The authorization runtime client 608 may allow or deny access for the resource specified by "ResourceURN" by the client 602 (similar to the operations of 554 of FIG. 5). If access is denied, the web resource service 614 may return an indication 656 that access is denied. Otherwise, if access is allowed, the web resource service 614 may return an indication 656 that access is granted and allow access to the resource or access to the resource specified by ResourceURN to the client 602.

Figure 7:
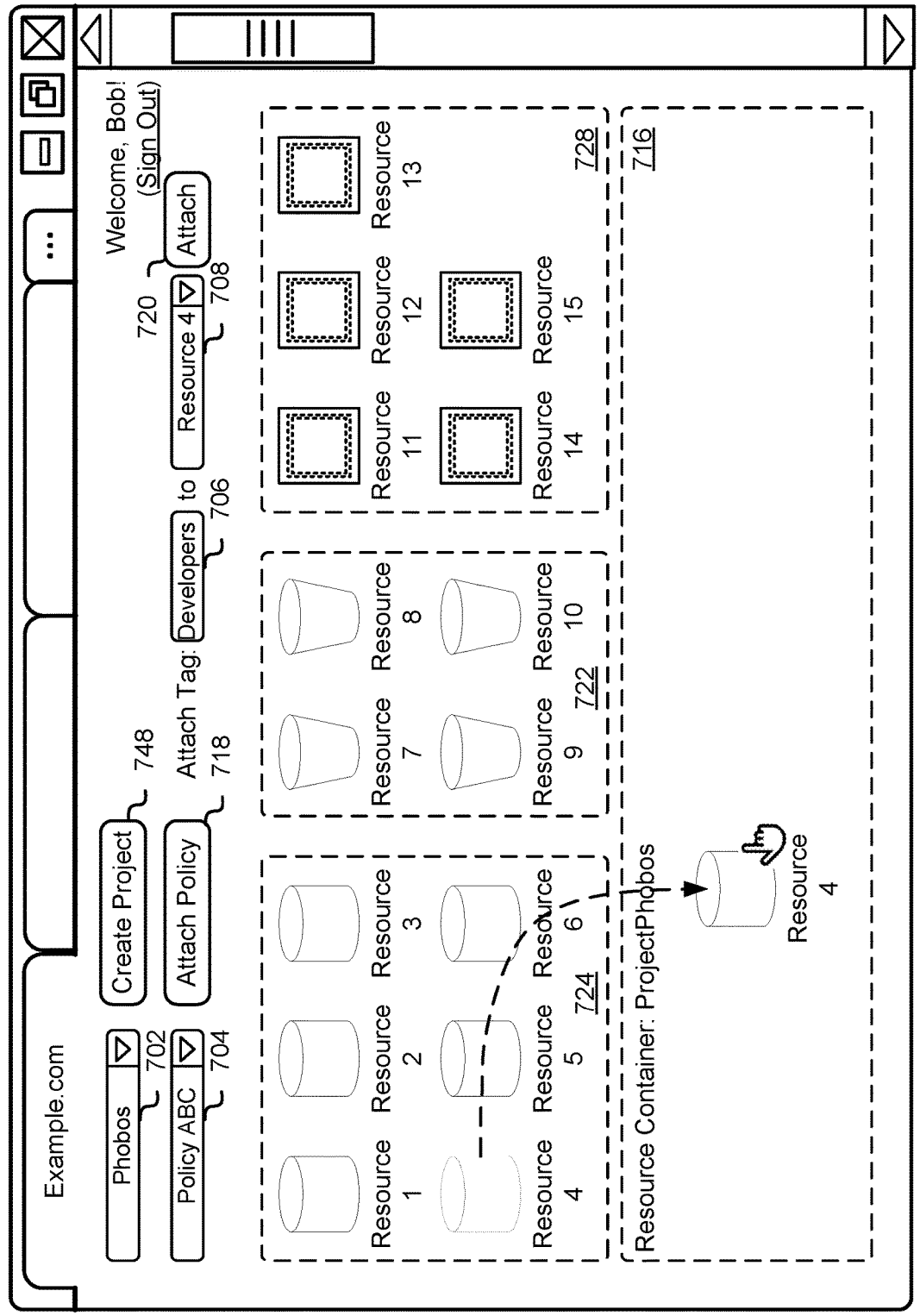
FIG. 7 illustrates an example of a webpage enabling customers to manage resource containers, in accordance with at least one embodiment.

FIG. 7 shows a webpage 700, which may be displayed by an application executed by a computing system, such as the client 102 as described in connection with FIG. 1, enabling a customer to interact with a resource container service operated by a computing resource service provider. As illustrated in FIG. 7, the webpage 700 includes various graphical user interface elements that enable customers to create a resource container via the Create Project 748 button, attach a policy to the resource container via the Attach Policy 718 button, and attach various tags to various resources within the resource container via the Attach 720 button. The webpage 700 also includes various graphical user interface elements that depict various resource services, such as a database service 724, on-demand storage service 722, and virtual computer system service 728; the customer may have access to these services and may attach various resources from these services to the resource container. In various embodiments, the customer interacts with the resource container service through the webpage 700. The webpage 700 may be displayed by various applications, such as a mobile application or web browser.

The customer may have access to the database service 724, on-demand storage service 722, and virtual computer system service 728. These resource services 722, 724, and 728 may utilize various access policies that enable the customer access to them. In an embodiment, a database service refers to service configured to manage and provide access to various databases, organized collections of data, tables, queries, reports, views, and other objects. The customer may interact with the database service to manage, operate, and modify various databases. In an embodiment, an on-demand storage service refers to a service configured to process requests to store and/or access data. The customer may interact with the on-demand storage service to manage, operate, access, and modify various data objects. In an embodiment, a virtual computer system service refers to a service configured to provide computer system resources for customers. The virtual computer system service may provide such computer system resources by instantiating virtual machine instances on physical hardware. The customer may interact with the virtual computer system service to provision, place and operate virtual machine instances that are instantiated on physical computer devices hosted and operated by the computing resource service provider.

As illustrated in FIG. 7, the webpage 700 may contain a graphical user interface element configured as input boxes configured to enable the customer to enter a project name 702 for a resource container, and a project policy 704 for the resource container. The resource container service may create the resource container with the project name 702, depicted as "Phobos" in FIG. 7, and project policy 704, depicted as "Policy ABC" in FIG. 7. The created resource container may be depicted graphically in the webpage 700 as the Resource Container: ProjectPhobos 716, and may be denoted as "ProjectPhobos." The customer may attach various resources from various resource services 722, 724, and 728 to "ProjectPhobos" utilizing the Resource Container: ProjectPhobos 716. The customer may select a desired resource from the resource services 722, 724 and 728, and "drag and drop" the desired resource into the Resource Container: ProjectPhobos 716 to attach the desired resource to "ProjectPhobos." In some examples, "drag and drop" refers to a process in which a user selects a virtual object, and virtually drags the virtual object to a desired location. For example, FIG. 7 depicts "Resource 4" attached to the Resource Container: ProjectPhobos 716 via a "drag and drop" process from the database service 724.

The webpage 700 may enable the customer to attach tags to various resources within the created resource container, which may be specified via the tag field 706 and resource field 708, and attached via the Attach 720 button. In some examples, a tag is a data object such as a sequence of bits. The tag may specify various policies and additional data regarding aspects of various resources, such as access policies, usage, size, location, and/or variations thereof. The input to the tag field 706 may be an identifier specifying the specific tag, a location of the specific tag, and/or variations thereof. The input to the resource field 708 may be the specific name of the resource, or an identifier of the resource. For example, "ProjectPhobos" may comprise the resource "Resource 4," in which the customer may desire to attach the tag "Developers" to the resource "Resource 4." Continuing with the example, the customer may input "Developers" as an input to the tag field 706, and "Resource 4" as an input to the resource field 708. Continuing with the example, the resource container service may retrieve the tag specified by "Developers" and attach the tag to the resource "Resource 4." In some examples, the tag may be attached to the resource "Resource 4" in the form of metadata. Additionally, the tag may be attached to the resource "Resource 4" as part of the resource container that the resource "Resource 4" is part of, such as the resource container "ProjectPhobos."

Note that the graphical user interface of the webpage 700 is presented for illustrative purposes only, and implementations of the systems of the present disclosure may implement user interfaces different from that depicted in FIG. 7; for example, an implemented user interface may not be web-based or may have more, fewer, or different interface controls and/or information from those depicted in the webpage 700. Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810, and it should be understood that there could be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the electronic client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto, and the application server 808 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the electronic client device 802. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, the resource container service 818 is a collection of computing resources, physical and/or virtual, configured to receive and process requests submitted by entities, such as the electronic client device 802, for resource containers. The resource container service 818 may run on one or more servers in the system 800, such as on the at least one application server 80. In various embodiments, the resource container service 818 is the same as the resource container service 106 as described in connection with FIG. 1. The resource container service 818 may create and constrain various resource containers with various policies that may denote restrictions for access to the resource containers. The resource container service 818 may implement a request API that may be utilized by the electronic client device 802. Further information regarding the resource container service 818 can be found in the description of FIG. 1.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization, and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
    creating a first customer account and a second customer account at a computing resource service provider, wherein the first customer account is assigned to a first business organization and the second customer account is assigned to a second business organization different from the first business organization, and wherein a computing resource assigned to the second customer account is inaccessible to users of the first customer account but accessible to users of the second customer account;
    creating a resource container usable to associate with one or more computing resources provided to customers by the computing resource service provider;
    associating a user of the first customer account with the resource container;
    associating an access policy with the resource container, the access policy controlling access to the one or more computing resources associated with the resource container;
    causing, by associating the computing resource assigned to the second customer account with the resource container, the computing resource assigned to the second customer account to also be accessible to the users of the first customer account; and
    as a result of determining, based on the access policy of the resource container, that the user is authorized to access the resource of the second customer account, causing the user to obtain the access to the computing resource of the second customer account.

2. The computer-implemented method of claim 1, wherein:
    the method further comprising receiving, from a service of the computing resource service provider that hosts the computing resource, a request to determine whether the user associated with the first customer account is authorized; and
    the determining that the user is authorized to access the one or more computing resources is performed in response to the request.

3. The computer-implemented method of claim 1, wherein:
    associating the access policy with the resource container further includes storing, in association with an identifier corresponding to the resource container, the access policy at a platform data store; and
    determining, via the identifier, that the user is authorized to access the one or more computing resource further includes obtaining the access policy from the platform data store.

4. The computer-implemented method of claim 1, wherein the resource container is a data structure that logically associates the one or more computing resources with a common project.

5. The computer-implemented method of claim 1, wherein:

the first business organization is located in a first geographic region; and the computing resource of the second customer account is located within a second geographic region different from the first geographic region.

6. A system, comprising:

one or more processors; and memory that stores computer-executable instructions that, if executed, cause the system to:
  create a first account of a first business organization and a second account of a second business organization, wherein a resource assigned to the first business organization is accessible to members of the first business organization but inaccessible to members of the second business organization;
  perform a set of operations to cause the resource to also be accessible to a member of a second business organization, the set of operations causing the system to:
    create a project to associate with a set of resources;
    associate a policy that controls access to the set of resources with the projects;
    associate the resource with the set of resources of the project; and
    associate the member of the second business organization with the project;
  obtain a request from the member of the second business organization to access the resource;
  determine, based on the policy, that the member of the second business organization is authorized to access the resource of the first business organization; and
  grant the member of the second business organization the access to the resource of the first business organization.

7. The system of claim 6, wherein the resource comprises:
a database table,
a virtual machine instance, or
an object data store with an on demand storage service.

8. The system of claim 6, wherein:
the policy specifies that the access to the resource depends at least in part on a tag being assigned to the resource; and
the computer-executable instructions further include instructions that further cause the system to assign, in response to a request from a member of the first business organization, the tag to the resource.

9. The system of claim 6, wherein the computer-executable instructions further include instructions that further cause the system to:
  obtain a request to disassociate a subset of the set of resources from the project; and
  in response to the request, disassociate the subset of resources from the project.

10. The system of claim 6, wherein the computer-executable instructions further include instructions that further cause the system to:
  receive an additional request from the member of the second business organization to cause a second resource accessible to members of the second business organization to be accessible to a member of the first business organization;
  in response to the additional request, perform another set of operations that causes the system to at least associate the second resource with the set of resources of the project; and
  determine, based at least in part on the policy, to grant the member of the first business organization access to the second resource.

11. The system of claim 6, wherein:
the policy indicates to deny the access to resources in a particular geographic region; and
the computer-executable instructions that cause the system to determine that the member is authorized to access the resource further includes instructions that further cause the one or more processors to determine, based on the policy, that the resource is physically located in a different geographic region from the particular geographic region.

12. The system of claim 6, wherein the computer-executable instructions that cause the system to perform the set of operations are performed in response to a request from a member of the first business organization.

13. The system of claim 6, wherein:
the project is a first project; and
the computer-executable instructions further include instructions that further cause the system to:
  create a second project associated with a second set of resources;
  cause the resource to be associated with the second project; and
  determine, based on a second policy associated with the second project, that a member of a third set of entities unassociated with the first project is authorized to access the resource.

14. A non-transitory computer-readable storage medium storing thereon executable instructions that, as a result of being executed by one or more processors of a computer system, cause the computer system to at least:
  create a first account of a first business organization and a second account of a second business organization, wherein the first account is associated with a first resource that is accessible to users of the first account but inaccessible to users of the second account;
  associate the first resource with a project;
  assign a first user of the first account and a second user of the second account to the project as authorized participants;
  receive a request to grant, to the second user, access to the first resource;
  make a determination based on the authorized participants and a set of policies associated with the project whether the second user is authorized to be granted the access to the first resource; and
  as a result of the determination, grant the second user of the second business organization the access to the first resource of the first business organization.

15. The non-transitory computer-readable storage medium of claim 14, wherein the executable instructions further comprise instructions that further cause the computer system to:
  obtain, from the a user of the first account, an additional request, the additional request being to remove the first resource from the project;
  in response to the additional request, remove the first resource from the project; and
  as a result of a second determination based on the authorized participants and the set of policies associated with the project, deny the second user the access to the first resource.

16. The non-transitory computer-readable storage medium of claim 14, wherein:

the first user and the first resource are physically located in a first geographic region; and the second user and a second resource associated with the project are physically located in a second geographic region different from the first geographic region.

17. The non-transitory computer-readable storage medium of claim 14, wherein:

the project is a first project; and the executable instructions further include instructions that further cause the computer system to:

associate the first resource with a second project; and assign a third user as an authorized participant in the second project, the third user lacking memberships in the first account and the second account;

the executable instructions that cause the computer system to make the determination further include instructions that further cause the computer system to make the determination further based at least in part on authorized participants of the second project; and further as a result of the determination:

grant the third user the access to the first resource; and deny the third user the access to a second resource associated with the first project.

18. The non-transitory computer-readable storage medium of claim 14, wherein the executable instructions further comprise instructions that further cause the computer system to deny, as a result of the first resource being associated with the project, an additional request to associate the first resource to an additional project.

19. The non-transitory computer-readable storage medium of claim 14, wherein the executable instructions further include instructions that further cause the computer system to:

add to the set of policies a policy granting permission to the second user to add one or more resources to the project; and in response to receipt of an additional request associated with the second account to add a second resource of the second account with the project, associate the second resource with the project.

20. The non-transitory computer-readable storage medium of claim 19, wherein the executable instructions that cause the computer system to add to the set of policies are performed in response to a request associated with the first account to add the policy to the set of policies.

21. The non-transitory computer-readable storage medium of claim 14, wherein the executable instructions further cause the computer system to:

obtain an additional request to associate a time-based condition with access to the first resource; and the executable instructions that cause the computer system to make the determination further include instructions that further cause the computer system to determine that the access to the first resource by the second user is in compliance with the time-based condition.

* * * * *